United States Patent
Frid-Nielsen et al.

(10) Patent No.: US 12,039,260 B2
(45) Date of Patent: Jul. 16, 2024

(54) SYSTEM AND METHOD FOR GENERATING UPDATABLE STRUCTURED CONTENT

(71) Applicant: Medidata Solutions, Inc., New York, NY (US)

(72) Inventors: Martin Frid-Nielsen, Menlo, CA (US); Yau Pan Chan, Millbrae, CA (US); Daniel Stanley, San Francisco, CA (US)

(73) Assignee: MEDIDATA SOLUTIONS, INC., New York, NY (US)

( * ) Notice: Subject to any disclaimer, the term of this patent is extended or adjusted under 35 U.S.C. 154(b) by 116 days.

(21) Appl. No.: 16/228,745

(22) Filed: Dec. 20, 2018

(65) Prior Publication Data
US 2020/0201937 A1    Jun. 25, 2020

(51) Int. Cl.
*G06F 40/00* (2020.01)
*G06F 16/957* (2019.01)
*G06F 16/958* (2019.01)
*G06F 40/186* (2020.01)

(52) U.S. Cl.
CPC ........ *G06F 40/186* (2020.01); *G06F 16/9577* (2019.01); *G06F 16/986* (2019.01)

(58) Field of Classification Search
CPC .. G06F 16/958; G06F 40/186; G06F 16/9577; G06F 16/986
See application file for complete search history.

(56) References Cited

U.S. PATENT DOCUMENTS

| | | | |
|---|---|---|---|
| 11,393,566 B1* | 7/2022 | Kim | G16H 15/00 |
| 2002/0019839 A1* | 2/2002 | Shiu | G06F 16/972 |
| | | | 715/265 |
| 2004/0189716 A1* | 9/2004 | Paoli | G06F 40/143 |
| | | | 715/853 |
| 2017/0041296 A1* | 2/2017 | Ford | H04W 12/06 |

(Continued)

OTHER PUBLICATIONS

Goodman Youtube video, Apr. 18, 2017 https://www.youtube.com/playlist?list=PLw02n0FEB3E3VSHjyYMcFadtQORvl1Ssj.*
(Continued)

*Primary Examiner* — William L Bashore
*Assistant Examiner* — David Faber
(74) *Attorney, Agent, or Firm* — STEPTOE LLP; Carl B. Wischhusen

(57) ABSTRACT

A system for generating updatable structured content includes a definition processor, a template selector, and a content generator. The definition processor processes an updatable definition to produce a plurality of reusable typed-templates, each typed-template having (1) an associated type and at least one insertion point at which another typed-template may be inserted and (2) a pointer to the updatable definition. The template selector selects at least one reusable typed-template and its associated type to store in a hierarchical structure as masterdata, where the masterdata contain a pointer to the typed-template. The content generator uses the selected reusable typed-template to produce the updatable structured content according to the associated type with pointers back to the updatable definition. A change made to the updatable definition may be propagated to the structured content and to the typed-templates.

4 Claims, 15 Drawing Sheets

(56) References Cited

U.S. PATENT DOCUMENTS

2017/0061103 A1* 3/2017 Bain ............... G16H 10/20
2017/0308511 A1* 10/2017 Beth ............... G06F 40/169

OTHER PUBLICATIONS

Oasis, "Electronic Trial Master File (eTMF) Specification Version 1.0", Committee Specification 01, Oct. 25, 2016, 40 pages http://docs.oasis-open.org/etmf/etmf/v1.0/cs01/etmf-v1.0-cs01.pdf.*

EMC, "EMC ® Documentum® Electronic Trial Master File, Version 4.0, User Guide", EMC Corporation, copyrighted 2015, 126 pages.*

Pearce, Oliver "4 Ways the New eTMF Navigator Will Change How You Manage Clinical Trials", May 30, 2016, 7 pages.*

"Trial Master File (TMF) Reference Model, Version Control Policy", v1.1, Feb. 14, 2018, 7 pages.*

EMC Corporation "EMC® Documentum® Electronic Trial, Master File, Version 3.1, User Guide", 2012, 157 pages.

"Trial Master File (TMF) PLAN, Template Version 1.0", Feb. 2018, 20 pages.

"Trial Master File (TMF) Reference Model, Implementation Guide", Mar. 14, 2018, 20 pages.

"Trial Master File (TMF) Reference Model, User Guide", Mar. 16, 2018, 22 pages.

* cited by examiner

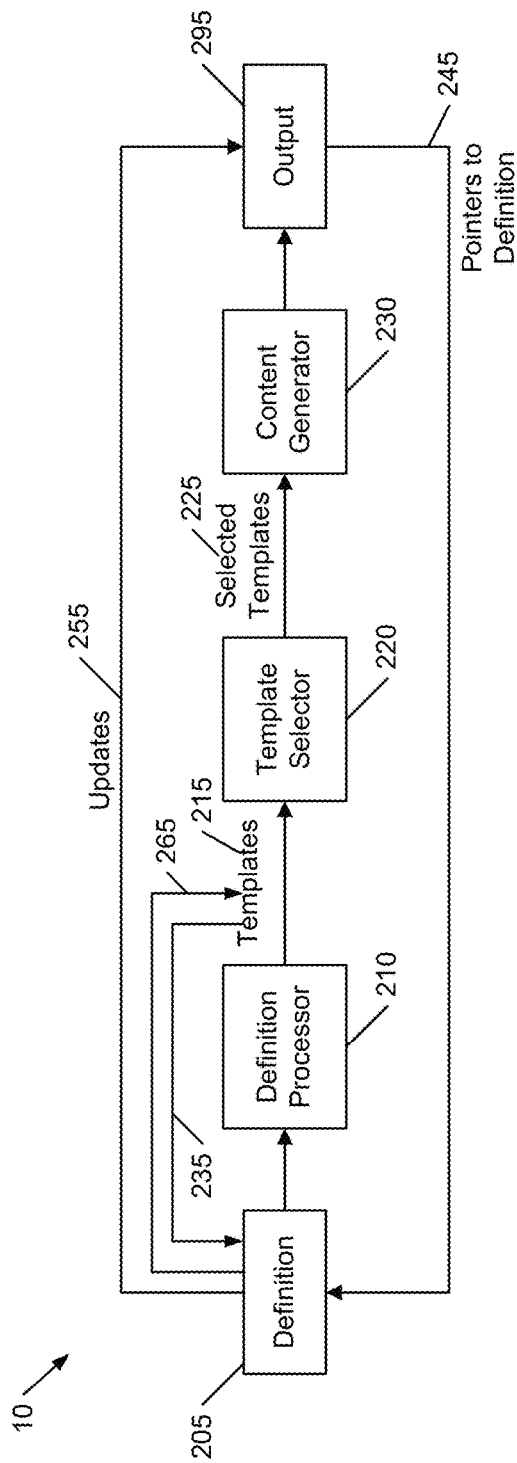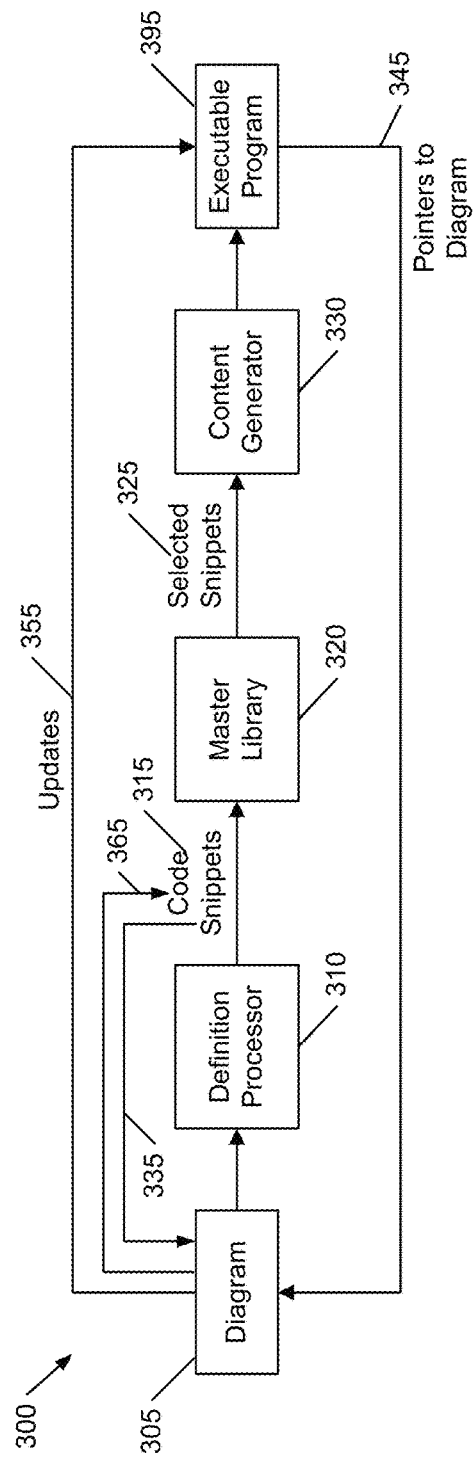

- ▽ 📁 01 Trial Management
  - ▷ 📁 01.01 Trial Oversight
  - ▷ 📁 01.02 Trial Team
  - ▷ 📁 01.03 Trial Committee
  - ▷ 📁 01.04 Meetings
  - ▷ 📁 01.05 General
- ▽ 📁 02 Central Trial Documents
  - ▷ 📁 02.01 Product and Trial Documentation
  - ▷ 📁 02.02 Subject Documentation
  - ▷ 📁 02.03 Reports
  - ▷ 📁 02.04 General
- ▷ 📁 03 Regulatory
- ▷ 📁 04 IRB or IEC and other Approvals
- ▷ 📁 05 Site Management
- ▷ 📁 06 IP and Trial Supplies
- ▷ 📁 07 Safety Reporting
- ▷ 📁 08 Central and Local Testing
- ▷ 📁 09 Third parties
- ▷ 📁 10 Data Management
- ▷ 📁 11 Statistics

FIG. 7A

| Select Required Artifacts | Zone | | Section | | Artifact | | Level | | |
|---|---|---|---|---|---|---|---|---|---|
| Selected Artifacts (X or NO) | Zone # | Zone Name | Section # | Section Name | Artifact # | Artifact Name | Study | Country | Site |
| X | 01 | Trial Management | 01.01 | Trial Oversight | 01.01.01 | Trial Master File Plan | X | | |

FIG. 7B

- ▽ ▢ MDSOL-001
  - ▷ ▢ General Documents
  - ▽ ▢ Trials
    - ▽ ▢ MDSOL
      - ▷ ▢ 01 Trial Management
      - ▷ ▢ 02 Central Trial Documents
      - ▷ ▢ 03 Regulatory
      - ▷ ▢ 04 IRB or IEC and other Approvals
      - ▷ ▢ 05 Site Management
      - ▷ ▢ 06 IP and Trial Supplies
      - ▷ ▢ 07 Safety Reporting
      - ▷ ▢ 08 Central and Local Testing
      - ▷ ▢ 09 Third parties
      - ▷ ▢ 10 Data Management
      - ▷ ▢ 11 Statistics
      - ▽ ▢ Countries
        - ▷ ▢ Argentina
        - ▷ ▢ Canada
        - ▽ ▢ United States
          - ▷ ▢ 01 Trial Management
          - ▷ ▢ 02 Central Trial Documents

FIG. 8A

- ▽ ▢ United States
  - ▷ ▢ 01 Trial Management
  - ▷ ▢ 02 Central Trial Documents
  - ▷ ▢ 03 Regulatory
  - ▷ ▢ 04 IRB or IEC and other Approvals
  - ▷ ▢ 05 Site Management
  - ▷ ▢ 06 IP and Trial Supplies
  - ▷ ▢ 07 Safety Reporting
  - ▷ ▢ 08 Central and Local Testing
  - ▷ ▢ 09 Third parties
  - ▷ ▢ 10 Data Management
  - ▷ ▢ 11 Statistics

FIG. 8B

▽ 🗀 Countries
　　▽ 🗀 United States
　　　　▽ 🗀 01 Trial Management
　　　　　　▷ 🗀 01.01 Trial Oversight
　　　　　　▷ 🗀 01.02 Trial Team
　　　　　　▷ 🗀 01.04 Meetings ▽ 🗀 Sites
　　▽ 🗀 3001-USA
　　　　▷ 🗀 01 Trial Management
　　　　▷ 🗀 02 Central Trial Documents
　　　　▷ 🗀 03 Regulatory
　　　　▷ 🗀 04 IRB or IEC and other Approvals
　　　　▷ 🗀 05 Site Management
　　　　▷ 🗀 06 IP and Trial Supplies
　　　　▷ 🗀 07 Safety Reporting
　　　　▷ 🗀 08 Central and Local Testing
　　　　▷ 🗀 10 Data Management
　　▷ 🗀 3002-USA
　　▷ 🗀 3003-USA
　　▷ 🗀 3004-USA

| Properties | |
|---|---|
| Folder | |
| Sites | |
| Folder Type | |
| Country Level | |
| Properties | |
| Name | Value |
| Level | *Country* |
| Country | - |
| ETMFInsertPoint | Site |
| Regulatory_Authority_Name | - |

FIG. 9C

☐ 📄 08.03.01 Relevant Communications

Document Details

| | |
|---|---|
| Name | 08.03.01 Relevant Communications |
| Parent Folder | 08.03 General |
| Type | 08.03 General |
| Title | 08.03.01 Relevant Communications |
| State | Accepted |
| Access Rights | Full |
| Owner | Prathusha Kakarla |
| Format | Placeholder |
| File Plan | File_Plan_1.6.xlsx |

FIG. 9D

Generate New Study Structure                                     ✕

Below is an outline of the steps to Generate a New Study Structure. As you progress, you'll be able to click "Back" in case you need to make modifications before the generation process is initiated.

① Step 1: Select Destination
Select the Folder where the generated Study Structure will exist within RCM.

② Step 2: Select Product
Select one Product from the list of Master Data items for Products.

③ Step 3: Select Study
Select one Study from the list of Master Data items for Studies.

④ Step 4: Select Country(ies)
Select one or more Countries from the list of Master Data items for Countries.

⑤ Step 5: Select Site(s)
Select one or more Sites from the list of Master Data items for Sites.

⑥ Step 6: Review/Generate
Review selected items and confirm before generating a Study Structure. Once the "Generate" button has been clicked, the system will begin processing the Study Structure and you will be notified when it's complete (via email and/or in the Notifications area in RCM).

[Next]  Cancel

FIG. 11

Properties

Document
01.01.11 Debarment Statement.

Properties

| Name | Value |
|---|---|
| Level | *Site* |
| Product_Name | *MedDrug* |
| Product_ID | *MDSOL-001* |
| ETMFInsertPoint | *None* |
| Section | *Trial Oversight* |
| Trial_Name | *MDSOL-400* |
| Protocol_ID | - |
| Brief_Protocol_Title | - |
| Phase | *III* |
| Therapeutic_Area | - |
| Indication | *Diabetes Type II* |
| Country | *United States* |
| Regulatory_Authority_Name | *Food and Drug Administration* |
| Site_ID | *1242* |
| Site_Name | *Maine Research Associates* |
| Zone | *01 Trial Management* |
| Z01_Section_Name | *01.01 Trial Oversight* |
| Doc_Expiry_Date | - |
| Doc_Date | - |
| 01_01_Artifact_No_Site | *01.01.11* |

FIG. 12B

SYSTEM AND METHOD FOR GENERATING UPDATABLE STRUCTURED CONTENT

BACKGROUND

In various contexts involving development for computer applications, a developer may generate a specification or a definition. A programmer may then write a computer program in source code based on that definition. A compiler or interpreter may convert that source code into an executable software program, as shown in FIG. 1A. Once the executable program has been generated, if the developer wants to make updates to the executable program, it is necessary to make changes to the definition and source code and then recompile the changes into a new executable program.

Another way of updating the code involves incremental compilation, which analyzes changes to the code and then compiles only those changes rather than the entire code base. However, this technique tends to work best with limited and well-defined changes, such as a change of a single of line of code, because it can be very hard to analyze the impact of all code changes, for example, if some referenced module is changed or self-modifying code is used and modified.

BRIEF DESCRIPTION OF THE DRAWINGS

FIG. 2 is a block diagram of a system that creates and updates content using a definition and templates, according to an embodiment of the present invention;

FIG. 3 is a block diagram of a system that converts a visual diagram into an executable software program, according to an embodiment of the present invention;

FIG. 7A is an example of an eTMF folder structure, according to an embodiment of the present invention;

FIG. 7B is a partial spreadsheet row from a file plan, according to an embodiment of the present invention;

FIGS. 8A-8D are examples of some of the parts of an eTMF folder structure, according to an embodiment of the present invention;

FIGS. 9A-9D are various screenshots related to generating an eTMF folder structure, according to an embodiment of the present invention;

FIG. 11 is a screenshot from a computer application used to generate an eTMF folder structure, according to an embodiment of the present invention; and FIGS. 12A-12B are examples of placeholders within a generated eTMF folder structure, according to an embodiment of the present invention.

Figure 1A:
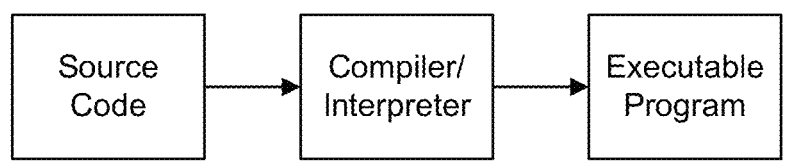
FIG. 1A is a diagram illustrating how source code may be converted into an executable software program.

Where considered appropriate, reference numerals may be repeated among the drawings to indicate corresponding or analogous elements. Moreover, some of the blocks depicted in the drawings may be combined into a single function.

DETAILED DESCRIPTION

In the following detailed description, numerous specific details are set forth in order to provide a thorough understanding of embodiments of the invention. However, it will be understood by those of ordinary skill in the art that the embodiments of the present invention may be practiced without these specific details. In other instances, well-known methods, procedures, components, and circuits have not been described in detail so as not to obscure the present invention.

Figure 1B:
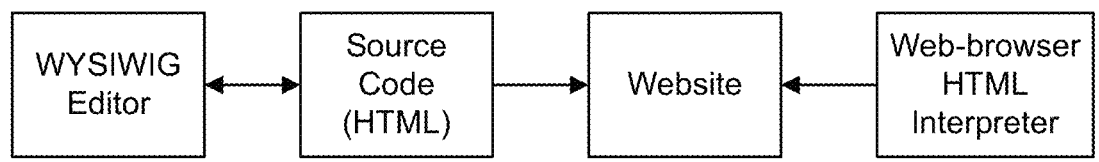
FIG. 1B is a diagram illustrating how a web page may be edited.

People have tried to solve the problems identified above. In the context of Internet content, HTML may be used as the definition for a web page rendered by a browser, which is analogous to the example shown in FIG. 1A. As web programming became more pervasive, however, the need arose for users to create web pages without having to code HTML, and systems were built where users could create "WYSIWYG" web pages using a layout tool similar to Adobe® Dreamweaver®, which then generates the website. This evolved further into two-way web-page editing, as depicted in FIG. 1B, where users could both modify code directly and also do it using a WYSIWIG layout tool. The problem here was the inability to represent all the various forms of HTML code in a WYSIWIG fashion, for instance for dynamic or personalized web pages. The problem may manifest itself when there are repetitive blocks or structures used throughout with variations, for instance if there is a Products section available in different languages on the website, in which case there is a similar structure (Product), but the content varies from product to product.

The inventor has developed a system and method to create and update content using a definition and templates. The system generates reusable templates from one or more definitions and then generates an output (or "generated content") based on reusable templates selected by a user that fit together in a structure. As part of the content generation process, markers or pointers are stored in the generated content that point back to the definition. This makes it possible to propagate certain changes in the definition directly to the generated structured content and also makes it possible to propagate changes to the generated structured content back to the definition.

Reference is now made to FIG. 2, which is a block diagram of a system 10 that creates and updates a generated content structure using a definition and templates. Definition 205, which may be an updatable definition, is input to definition processor 210, which processes the updatable definition to produce at least one reusable typed-template 215. A definition may contain all or part of the entire structure, however each part of the structure contains type information. In addition, multiple definitions may be processed. The definition is represented in a digital format that for instance may be updated by an editing tool or generated by another program. The reusable typed-template is reusable because it has a defined read-only structure that can be duplicated and can be used for more than one generated content structure. A "typed-template" is a template directed to a certain type of content—for example, for a website there may be template types for the Home page and Product page. Different definitions can generate templates of the same type but with different content, for example, for some Product pages there may be subsections, but for others not. The template includes insertion points at which other typed-templates may be inserted. Insertion points help instruct the generator how to assemble the structure—for example, for a Home-page template, there may be an insertion point for one or more Product-page templates. The template also contains a pointer 235 back to the definition.

A template selector 220 may select one of the reusable typed-templates and its associated type to store as "masterdata," which are data that contain a pointer to the templates. The masterdata (or pointer data) are typically organized in a hierarchy, which helps define the structure—going back to the website example, "Product page" is under the "Home page." There will typically be a variety of typed-templates from which to pick during this template selection process. Using selected templates 225, a content generator 230 generates or produces nested, structured content, such as output 295, according to type with pointers back to the definition. "According to type" means that the generated structure has the templates inserted in the correct position and according to type—for example, if three Products templates are selected, they will be put under the Home page. Pointers 245 to definition are the pointers back to definition 205, similar to pointers 235 from templates 215. Updates 255 indicate that a change made to updatable definition 205 may be propagated to output 295. For example, if the user changes the definition, the system can detect this either by monitoring for the change or by having the user tell the system interactively. The system can propagate the change since it knows where the definition is used. It does this by comparing the output of the definition processor to the generated content. Updates may also be made to templates 215 as indicated by arrow 265. Moreover, updates made to output 295 may be propagated back to definition 205 via pointers 245, because the system knows the relationship between output and definition. Changes to the output can also be detected by monitoring the output or having explicit commands executed by the user.

This system may be used in at least several different contexts or use cases. Referring back to the computer program context of FIG. 1A, and as now depicted as system 300 in FIG. 3, the use case is creating and updating a computer program. Within this context, the definition may be a diagram 305 of a structured computer program in which each part of the structure is represented as a connected entity in the diagram. There is no code in diagram 305. Definition processor 310 in this context creates code snippets 315 for each entity in diagram 305. Each snippet contains information about which other snippets it connects to, based on information in diagram 305 expressed as an insertion point for later substitution, and information about the diagram from which it originated. Each snippet includes a pointer 335 back to diagram 305.

The template selector in this context is master library 320 with references to code snippets coming from different diagrams. Each library entry contains a pointer or additional information, i.e., metadata, about the snippets, including actual code that can be used to substitute for code in the snippets at an insertion point. Each snippet can be represented in master library 320 more than once, with different metadata. Selected snippets 325 from master library 320 are sent to content generator 330, which generates either compilable code and/or executable computer program 395 (the output or generated content). Content generator 330 uses information (e.g., the insertion point) in the supplied snippets to create the computer program structure and insert the actual code based on master library metadata. Diagram 305 can be updated with new or changed functionality, using updates 355, and the generated code and snippets 315 (as indicated by arrow 365) are then updated, either by automatically detecting changes to the definition or the user interactively forcing an update as pointers 345 establish a link between generated code 395 and diagram 305. In this way, updates to generated code 395, either detected automatically or if the user interactively forces an update, may be propagated back to diagram 305 using pointers 345.

Figure 6A:
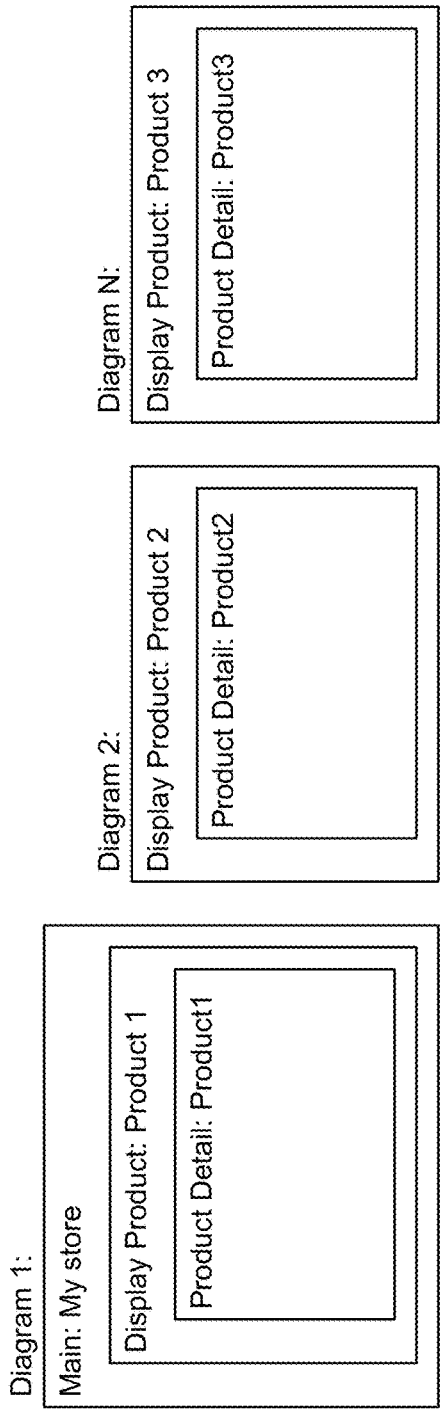
FIGS. 6A-6D show an example of a structured computer program, according to an embodiment of the present invention.

An example of a structured computer program is now provided, with reference to FIGS. 6A-6D. This example is for a program that can display a list of products offered by a store. Each box in FIG. 6A represents code, and the boxes that are shown as contained in other boxes signify structure. The "main" function may, for example, contain code that welcomes the user and lists the available products. The "main" function also includes an insertion point for "Products." In addition to the "main" code, there may be another module called "Display Product," which displays a picture of the product and also includes an insertion point for "Product Details," which is code that displays details for a product. The corresponding code might look like this:

```
main( )
{
    printf('Welcome to our store');
    printf('We offer the following products:');
    <PRODUCTS>
}
ProductsApple( )
{
    ShowImage('apple.png');
    <PRODUCTDETAIL>
}
ProductDetailA( )
{
    Printf('Here is an Apple')
}
ProductsBananas( )
{
    Printf('I am a Banana, but there is no picture or additional details');
}
```

Besides these code snippets there are metadata that helps the content generator ensure that, for example, ProductDetail for a Pear is not shown for ProductsApple. Also in the Banana example there is separate detail. These are all examples of diversions that allow for variances in the structure.

Referring back to FIG. 6A, and in conjunction with the code example presented above, three diagrams are shown—Diagram 1, Diagram 2, and Diagram N. Diagram 1 includes an entire program having structure that includes a Main section, a Display Product section, and a Product Detail section. Diagrams 2 and N have structure that includes just a Display Product section and a Product Detail section.

Figure 6B:
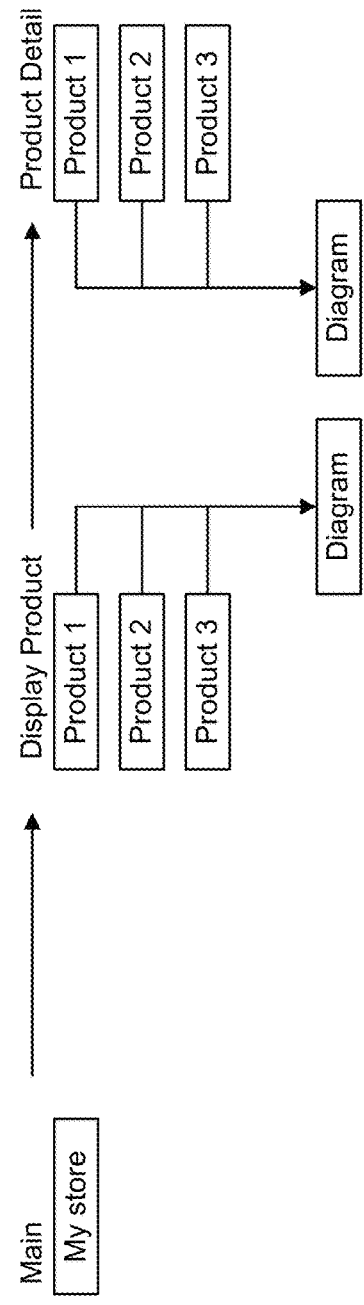
Figure 6C:
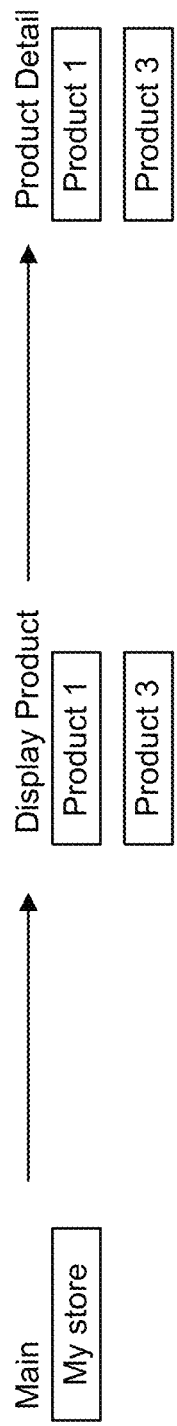

These diagrams are input to definition processor 310, which outputs code snippets (or typed-templates) as shown in FIG. 6B. The code snippets Product 1, Product 2, and Product 3 within Display Product all include pointers back to the associated Diagrams, e.g., from Product 1 to Diagram 1, etc. Similarly, the code snippets Product 1, Product 2, and Product 3 within Product Detail also include pointers back to the associated Diagrams. FIG. 6C shows the selected snippets available from master library 320—Product 1 and Product 3 within Display Product and Product 1 and Product 3 within Product Detail.

Figure 6D:
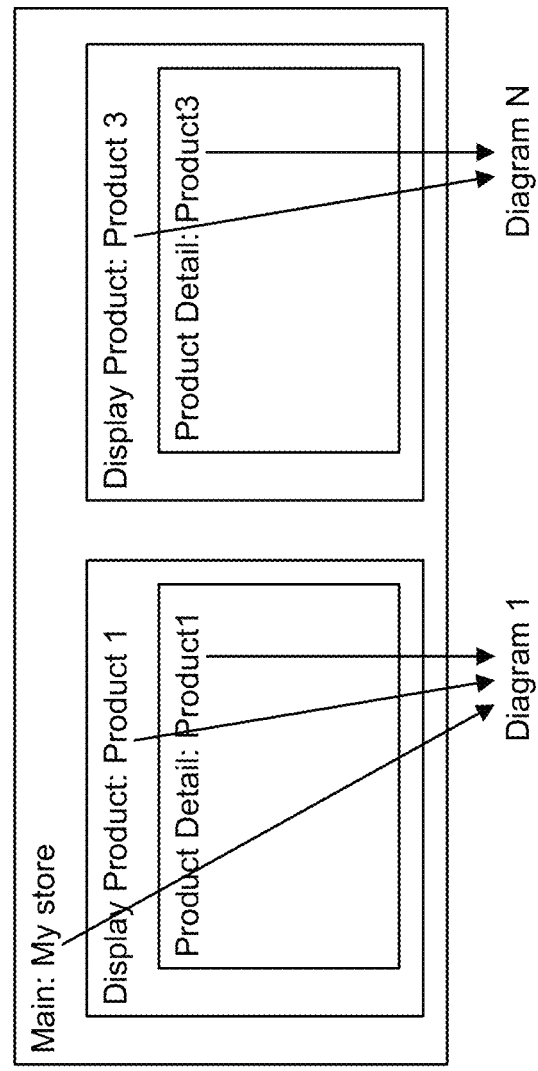

These selected snippets are input to content generator 330, which outputs the executable program shown in FIG. 6D. It shows the Main portion with Display Product portions for Product 1 and Product 3. Each of the Display Product portions includes a Product Detail portion for the respective Products. The Main portion and the incorporated Display Product portion and Product Detail portion for Product 1 include pointers back to Diagram 1, and the incorporated Display Product portion and Product Detail portion for Product 3 include pointers back to Diagram N. If any of the Diagrams (Diagram 1 or Diagram N) change, for instance if the Product Detail for Product 3 is updated in Diagram N, the system can force an update of all the executable programs that reference Diagram N, by re-processing Diagram N only and allowing content generator 330 to regenerate executable programs 395 using the updated snippets. Similarly, if a change to executable program 395 is detected, the referenced Diagram can also be updated via pointers 345.

Figure 4:
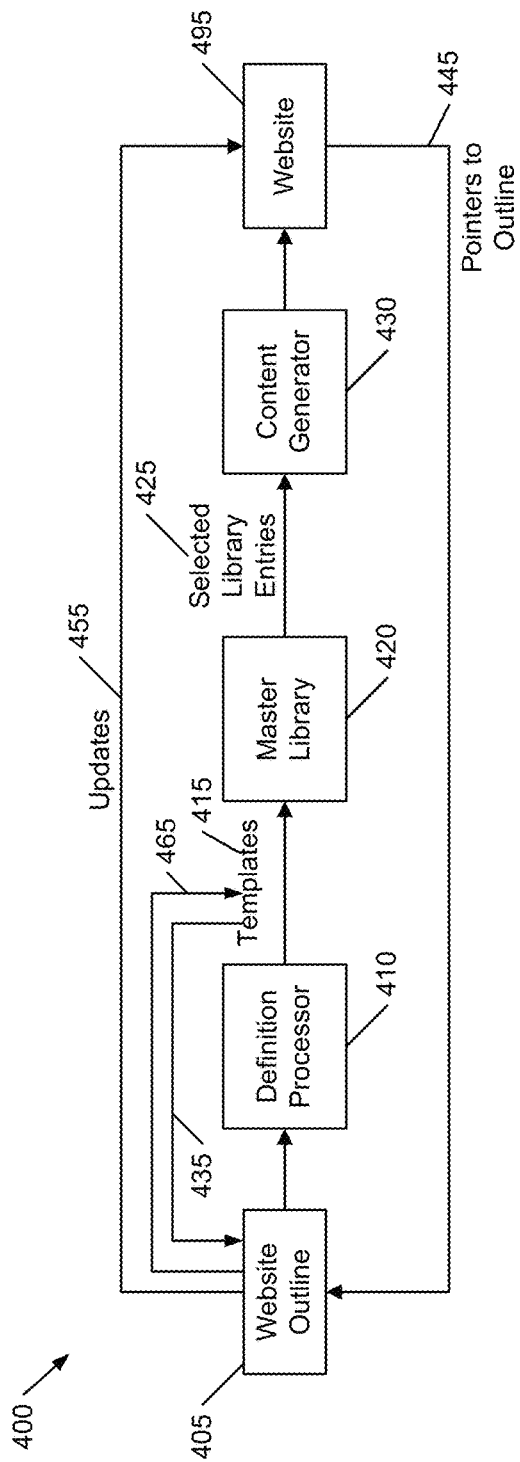
FIG. 4 is a block diagram of a system that converts a website outline into a website, according to an embodiment of the present invention.

Referring back to the website context of FIG. 1B, and as now depicted as system 400 in FIG. 4, the use case is creating and updating a company website. Within this context, the definition may be outline 405 of an entire company website, with each entry representing a web page, organized in a hierarchical tree structure. This outline may look like an indented list in which each item in the list represents a page in the website:

```
               Home
                  Product 1
                     Pricing
                  Product 2
                     Pricing
                        Documentation
                  Product 3
                     Documentation
```

There is typically no actual content in this outline. Definition processor 410 in this context creates templates 415 for each entry or page in the outline. The template contains (a) the name of the page, taken from the outline; (b) the content to be supplied; (c) its children in the outline (an "About" web page may, for example, contain a "Company History" section); and (d) a reference or pointer 435 back to outline 405.

The template selector in this context is master library 420 of templates coming from different outlines. Each library entry references a template and contains other metadata, for example, the actual content to be used to substitute "content to be supplied" in the template and in which languages the page is written. Each template can be represented in this library more than once, with different metadata. The selected library entries 425 are sent to content generator 430, which creates a website 495 (the output or generated content) using entries from master library 420. Content generator 430 uses information in the supplied templates to create the website structure and insert the actual content based on master library metadata. An update 455 can be made to the website and templates 415 (as indicated by arrow 465) if the outline changes, either by automatically detecting changes to the definition or the user interactively forcing an update by re-generating the websites where the pointers 445 point back to the specific, changed outline. Similarly, if the website changes by automatically detecting changes or the user interactively forces an update, the definition can also be updated using pointers 445.

Figure 5:
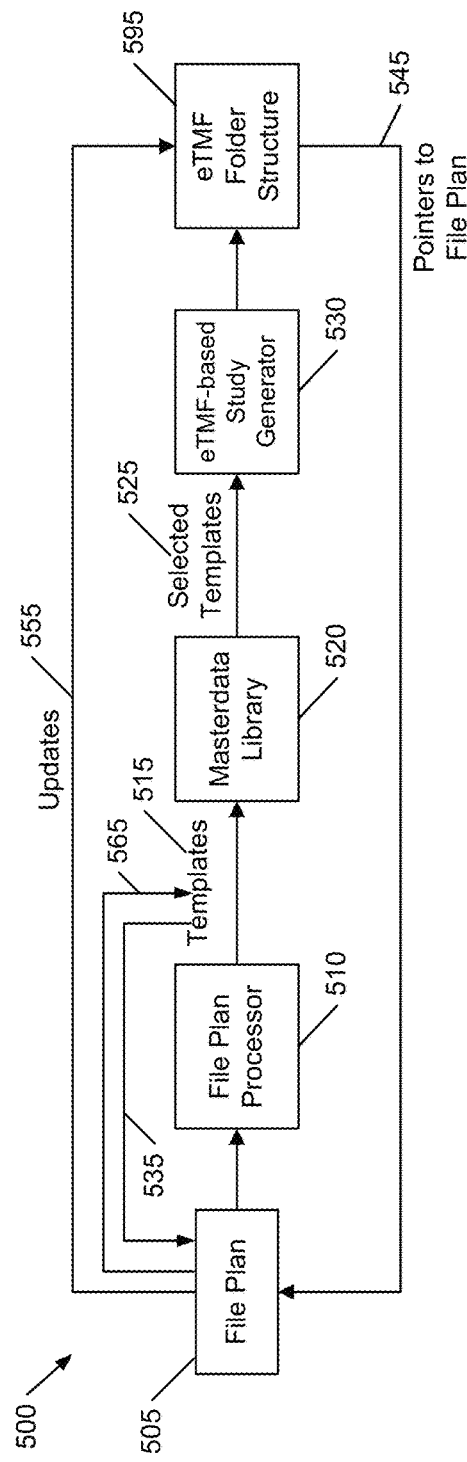
FIG. 5 is a block diagram of a system that converts a file plan into an electronic trial master file, according to an embodiment of the present invention.

The system of the present invention may also be used in the context of a clinical study, as depicted as system 500 in FIG. 5. The use case for this context is creating and updating a folder structure for clinical study documents, such as an electronic trial master file (eTMF). An eTMF may have a folder structure based on what is known as the Drug Information Association (DIA) reference model. In this model, shown in FIG. 7A, data and information are organized in zones (eleven in total), sections (under zones), and levels (Product, Study, Countries, and Sites, each of which may have zones/sections as subfolders).

Figures 8C, 8D, 9A:
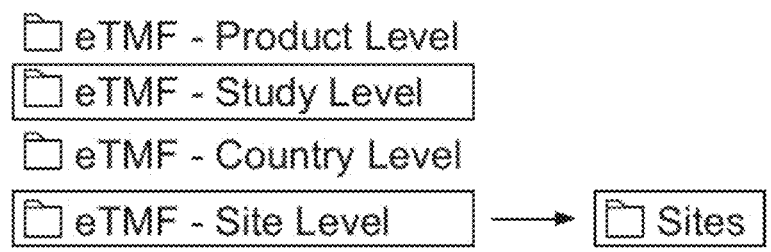

Within the clinical study context, the definition is file plan 505, expressed, for example, using a spreadsheet (such as in Microsoft® Excel®) with a row for each artifact or document placeholder and organized in a hierarchical tree structure, as shown in FIG. 7B (which shows partial rows from the DIA reference model). A placeholder is a special kind of document that exists prior to the actual data or information being created and indicates that data or information are to be provided. It is a zero-byte-sized file that operates as a signal or intent to have a document at that specific location in the folder structure. A file plan is a high-level document in which the user can describe which eTMF artifacts to include and at what level, for example, the Product, Study, Country, and Site levels. An artifact is the most atomic element of the file plan (and sub-artifacts are variations of artifacts). Typically, a clinical study folder structure may consist of thousands of folders and associated placeholders because, for example, there may be a folder structure for each site in a study and often there are hundreds of sites in a study spread across many countries. The assignee of this application, Medidata Solutions, Inc., has created a version of this spreadsheet meant for configuration purposes, where the user can specify which artifacts are included, how are they named, and what level they belong to. This folder structure is shown in FIG. 8A, and shows tiers that may exist above the DIA reference model, such as "General Documents" and "Studies." FIG. 8B shows the folder structure of the top-level zone folders at the Country level. Inside each zone are Section-level folders, as shown in FIG. 8C. FIG. 8D shows the folder structure at the Site level. Note that in this example, not all zones are included, per the site-level file plan.

The definition processor in the clinical study context (file plan processor 510) creates eTMF folder structure templates 515 that include placeholders (artifacts), folder structure, metadata, and other insertion points for each level in the hierarchy of the file plan. Each template also has information about which other templates can be included as well as a pointer 535 back to the file plan. Each folder structure template corresponds to each level of the study, including artifacts as specified in the file plan. The left side of FIG. 9A shows an example of folder structure templates for four levels of eTMF—Product Level, Study Level, Country Level, and Site Level. In addition, metadata are defined for folders and artifacts. Templates are important to the present invention because there is often granular reuse of folder structures, for example, a template can be created for US sites, UK sites, Canada sites, etc. These templates are then used by the content generator (eTMF-based Study Generator 530) to generate the full study content structure (generated content, output, or eTMF).

Figure 9B:
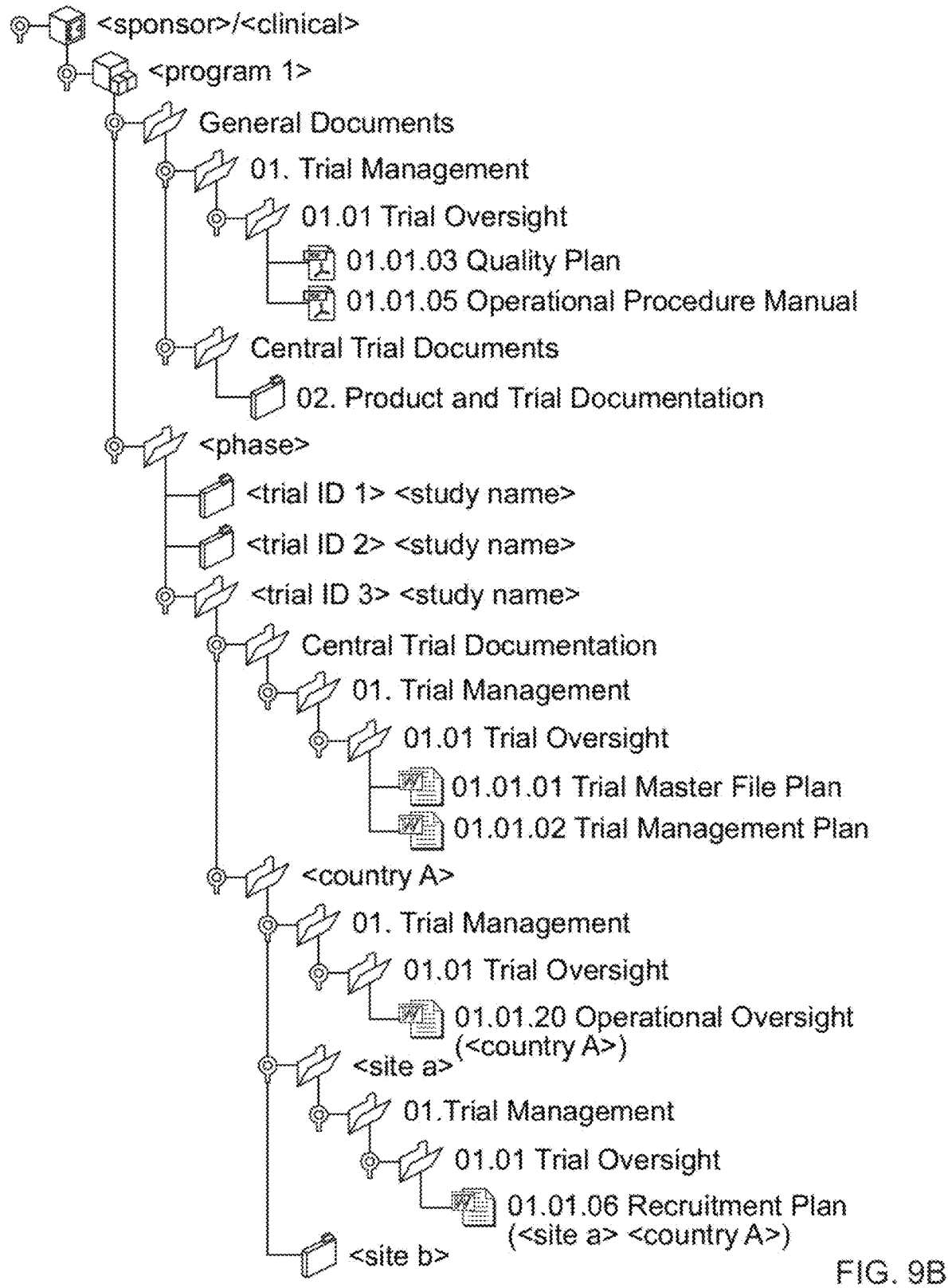

The template selector in the clinical study context is a masterdata library 520 that references the folder structure templates and has additional user-defined metadata for each entry, like a clinical study site name. Masterdata for each level of the study may include (a) a reference to the eTMF Folder Structure Template (e.g., for a given site, which eTMF folder structure should be used); (b) ACLs (access control lists)—users and groups that should have access to an instantiated folder structure template (an example of which is shown in FIG. 9B); and (c) metadata name-value pairs for specific metadata, for instance "Principal Investigator"="Joe Smith." "Instantiation" refers to creating an actual instance, meaning actual folders and placeholders, of a folder structure template. It includes placeholders that represent the collection of documents that are required for the study, organized by the Product, Study, Country, and Site levels. Each template can be represented in this masterdata library more than once, with different metadata.

An example of such metadata is shown in FIG. 9C, in which the Properties box tells the user how to nest the folder structure templates. In this example, the Folder is "Sites" (parent folder for all sites) and the Folder Type is "Country Level." Thus, the value for "Level" is "Country" and the value for "Country" has not yet been specified. The "Level" also indicates which type of Template is being used. The value for "ETMFInsertPoint" is "Site," which provides the insertion point for this Folder.

A collection of masterdata objects (called "selected templates" 525), selected from the entire universe of templates, is input to the content generator, in this context eTMF-based study generator 530, which creates a full clinical study folder structure with placeholders. Insertion points in the templates may be resolved (e.g., substituted by actual data) based on metadata in the masterdata library. When a new artifact is added to the file plan, it is also added to the generated content, i.e., eTMF folder structure 595, shown in FIG. 9B. As an example, a study may be conducted in eight countries and have a total of 125 sites. In this case, the input to eTMF-based study generator 530 will be 1 masterdata for the Product, 1 for the Study, 8 for the Countries, and 125 for the Sites. There will be different masterdata for each Country and Site, including potentially different eTMF folder structure templates for various Countries and Sites. A specific eTMF folder structure is updated (555) if the user makes a change to file plan spreadsheet 505, and templates 515 are updated as well, as indicated by arrow 565. For example, a specific artifact may be turned on, as the system maintains pointers 545 from the eTMF folder structure back to the file plan. A pointer back to the file plan is illustrated in FIG. 9D, which shows the Document Details of a specific document (in this case, "08.03.01 Relevant Communications"). Specifically, the "File Plan" is listed in the Document Details, and in this example is "File_Plan_1.6.xlsx." The Document Details also shows that the Parent Folder is 08.03 General. Pointers 545 back to the file plan may also be used if changes to the eTMF folder structure are detected. For example, if a document is removed from the eTMF folder structure it can be interpreted to mean that the corresponding entry in file plan spreadsheet 505 should be turned off.

The blocks shown in FIGS. 1A, 1B, and 2-5 are examples of modules that may comprise the various systems described and do not limit the blocks or modules that may be part of or connected to or associated with these modules. The blocks in these Figures may be implemented in software or hardware or a combination of the two, and may include memory for storing software instructions.

Figure 10:
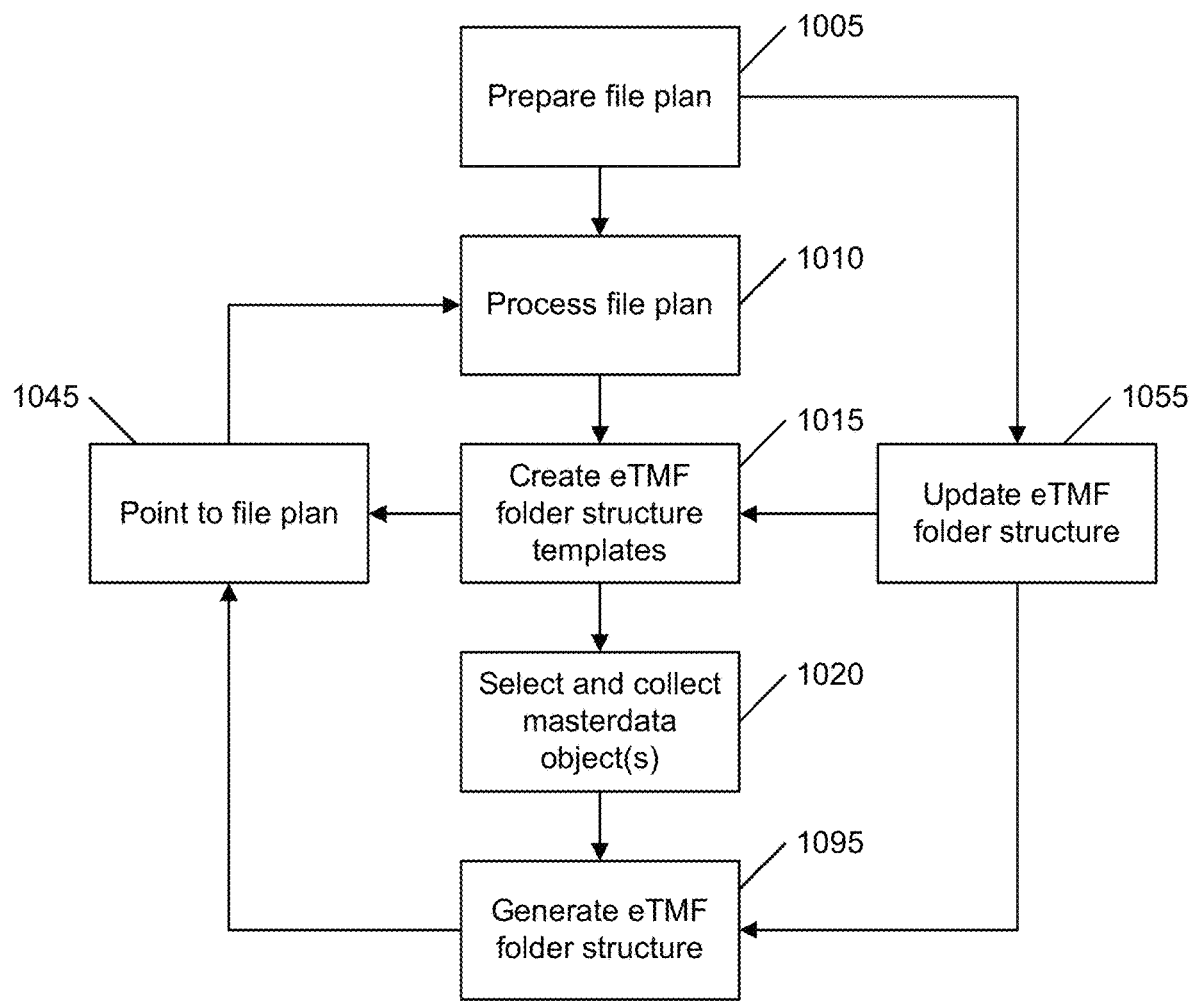
FIG. 10 is a flowchart showing a process for generating an eTMF folder structure, according to an embodiment of the present invention.

Referring now to FIG. 10, which is a flowchart showing a process for generating an eTMF folder structure, according to an embodiment of the present invention. In operation 1005, a file plan (description) is prepared by the user describing which eTMF artifacts to include under the Product, Study, Country, and Site levels and how the artifacts are named. This description may be expressed as a spreadsheet as stated above. In operation 1010, the file plan is processed by a file plan processor that interprets each row and column in the spreadsheet for information about which artifacts to include, where the artifacts belong in the eTMF folder structure, and what properties are associated with them. Part of the file plan processing is performed in operation 1015, in which separate eTMF folder structure templates are created for each level of the eTMF: study, country, and site. These templates also have a pointer to the file plan. Masterdata objects ("selected templates") may be selected and/or collected in operation 1020, each of which includes a pointer or reference to a template. The user may select in which countries the clinical study is performed, and then select the sites in those countries. The user knows the details of the study—the study requirements, where in the world it is being performed, and which sites are participating in each country. In operation 1095, an eTMF folder structure is generated using the masterdata objects. Once the eTMF folder structure is generated, it may be updated in operation 1055 using pointers to the file plan in operation 1045, for example if a new site or country is added to or removed from the File Plan. As described above, the generated study has a pointer back to the definition, so once a definition updates, the system will scan through all the generated templates and studies to establish which of these now need to have the File Plan changes reflect those updates. Similarly, if the generated study changes on its own, the pointers back to the definition can also be used to update the definition.

FIG. 11 is a screenshot from a computer application that may be used to generate the eTMF folder structure. The screen is presented to a user, who can select the destination directory or location where the Study Folder Structure will be placed, for example within a company's RCM (regulated content management) portal. After that, the user can select one product from the list of masterdata items for Products (if "Products" is one of the choices) and one study from the list of masterdata items for Studies. The user can then select one or more countries and one or more sites from the lists of masterdata items for Countries and Sites, respectively. Once these selections are made, the system will process the file plan, create eTMF folder structure templates, select and collect the masterdata objects, and generate the eTMF folder structure, as was described in operations 1010 to 1030 in FIG. 10.

Figure 12A:
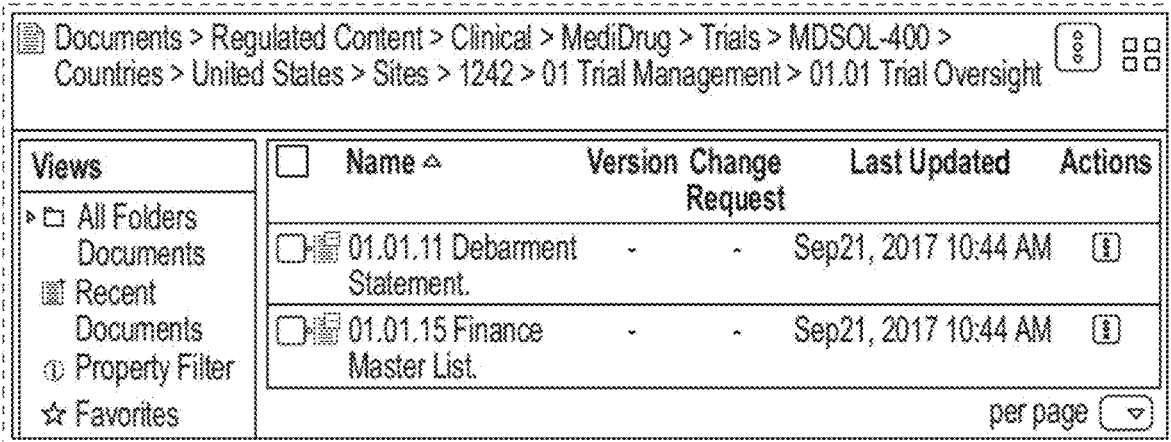

Within the generated eTMF folder structure there will initially be placeholder objects to help guide the sites as to what content to upload, as shown in FIG. 12A. Placeholders are typed, which among other things indicate the metadata associated with the placeholder and subsequently with the document when content is uploaded, as shown in FIG. 12B.

Besides the operations shown in FIGS. 10 and 11, other operations or series of operations are contemplated to create and update content using a definition and templates. For example, updates do not always occur, but the embodiments are described in ways that make updating the content easier. Moreover, the actual order of the operations in the flowcharts in FIGS. 10 and 11 is not intended to be limiting, and the operations may be performed in any practical order.

Embodiments of the invention in the clinical study context automate the process of creating, updating, and maintaining a multi-level folder structure for a study based on end-user input parameters. This folder structure may be populated with data, information, and metadata, and it may be enabled for subsequent charting and reporting on the state of the study. Advantages over prior approaches to the problem of generating content in different contexts include automation of the generation of a complete folder structure for a study; consistency and/or variances (as discussed below) in folder structures across studies, countries, and sites; and making updates to the definition that can be applied to generated templates and content and, vice versa, updates to the generated content can be reapplied back to the definition.

More generally, a system and method for creating and updating content using a definition and templates are provided that allow generated data structures that contain repetitive sub-structures to have variances and be dynamically updated. The generated data structures include computer programs, websites, documentation, and eTMF folder structures. The aspects that differentiate this approach and help overcome some of the limitations of prior methods include:

- support for variances for individual sites and countries in a generated structure;
- allowance for updates to any item in the generated templates and structure to be driven from a definition; and
- maintaining the ability to work, e.g., to add or remove artifacts, with the generated templates and structure while maintaining the ability to propagate changes from a definition and also update the definition based on changes to content in the structure.

This approach differs from prior methods because it uses typed-templates that are associated with masterdata that is assembled in a master library, and the content generation is based on selections from the master library.

Within the computer program use case, the system and method include links in the executable program and code snippets that point back to the source code or diagram.

Within the eTMF use case, the system and method automate the generation of the eTMF folder structure, in accordance with eTMF principles that divide the structure into Study, Country and Site levels, where elements at each level are allowed variances (such that different sites can use different templates). Updates may be made to the definition of the folder structure while content may be contributed to the folder at the same time.

Aspects of the present invention may be embodied in the form of a system, a computer program product, or a method. Similarly, aspects of the present invention may be embodied as hardware, software or a combination of both. Aspects of the present invention may be embodied as a computer program product saved on one or more computer-readable media in the form of computer-readable program code embodied thereon.

The computer-readable medium may be a computer-readable storage medium. A computer-readable storage medium may be, for example, an electronic, optical, magnetic, electromagnetic, infrared, or semiconductor system, apparatus, or device, or any combination thereof.

Computer program code in embodiments of the present invention may be written in any suitable programming language. The program code may execute on a single computer, or on a plurality of computers. The computer may include a processing unit in communication with a computer-usable medium, where the computer-usable medium contains a set of instructions, and where the processing unit is designed to carry out the set of instructions.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The invention claimed is:

1. A system for generating an updatable instantiation of an electronic trial master file (eTMF) folder structure, comprising:
    a file plan processor for processing an updatable file plan, the updatable file plan comprising a plurality of artifacts, each artifact being selectable for inclusion in an instantiation of an updateable eTMF folder structure, and each artifact specifying a level selected from a set of defined levels, to produce a plurality of reusable eTMF folder structure templates, each eTMF folder structure template having:
        an associated content type, selected from a set of defined content types, and at least one insertion point value specifying an associated content type of another eTMF folder structure template to be inserted hierarchically; and
        a pointer to the updatable file plan;
    a masterdata library for selecting at least one reusable eTMF folder structure template and its associated content type to store in a hierarchical structure as masterdata, wherein the masterdata contain a pointer to the eTMF folder structure template; and
    an eTMF-based study generator that uses the selected reusable eTMF folder structure template to produce the instantiation of the updatable eTMF folder structure according to the associated content type, said at least one insertion point, and the selected level, with pointers back to the updatable file plan,
    wherein a change made to the updatable file plan is automatically propagated to the instantiation of the eTMF folder structure and to the eTMF folder structure templates,
    wherein a change made to the instantiation of the eTMF folder structure is automatically propagated to the updatable file plan, and
    wherein said change to the instantiation of the eTMF folder structure is made by removing an artifact, from the plurality of artifacts, via a user interface by unchecking a box.

2. The system of claim 1, wherein the masterdata library selects a plurality of reusable eTMF folder structure templates and the eTMF-based study generator uses the selected reusable eTMF folder structure templates to produce the instantiation of the updatable eTMF folder structure according to the associated content types with pointers back to the updatable file plan.

3. The system of claim 1, wherein the change made to the instantiation of the updatable file plan is also propagated to any already produced eTMF folder structure templates and future produced, eTMF folder structure and eTMF folder structure templates.

4. The system of claim 1, wherein the set of defined levels comprises: study, country, and site.

* * * * *